United States Patent [19]
Chaiken et al.

[11] Patent Number: 5,837,424
[45] Date of Patent: *Nov. 17, 1998

[54] OPTICAL STORAGE MEDIUM AND PROCESS

[75] Inventors: Joseph Chaiken, Fayetteville; Joseph M. Osman, Utica, both of N.Y.

[73] Assignee: Syracuse University, Syracuse, N.Y.

[ * ] Notice: The term of this patent shall not extend beyond the expiration date of Pat. No. 5,691,091.

[21] Appl. No.: 846,848

[22] Filed: May 1, 1997

Related U.S. Application Data

[62] Division of Ser. No. 481,818, Jun. 7, 1995, Pat. No. 5,691,091.

[51] Int. Cl.⁶ .............................. G11B 7/24; G11B 7/00
[52] U.S. Cl. ................. 430/270.12; 430/945; 430/19
[58] Field of Search ............... 430/270.12, 945, 430/19; 369/288; 428/64.4

[56] References Cited

U.S. PATENT DOCUMENTS 4,548,889  10/1985  Nemoto et al. ............... 430/270.11
4,711,815  12/1987  Yoshiike et al. ............... 430/270.12

*Primary Examiner*—John A. McPherson
*Attorney, Agent, or Firm*—Wall Marjama Bilinski & Burr

[57] ABSTRACT

A data storage process which includes an erasable high speed, high density, storage medium having a transition metal oxide layer where said oxide layer is capable of undergoing an optically readable chemical change when simultaneously exposed to heat and to light of a selected wavelength. An optically readable image is formed in selected regions of the oxide layer under ambient conditions which include $O_2$ by simultaneously exposing said layer to heat and to radiation in the blue-green or shorter wavelength spectrum. The image is erased by heating the entire medium using a furnace or by heating selected portions with IR radiation.

7 Claims, 2 Drawing Sheets

OPTICAL STORAGE MEDIUM AND PROCESS

This application is a division of application Ser. No. 08/481,818 filed Jun. 7, 1995 which application is now U.S. Pat. No. 5,691,091.

This invention was made with government support under Grant No. F30602-92-C0042 from the United States Air Force, Rome Laboratories. The government has certain rights in this invention.

BACKGROUND OF THE INVENTION

The present invention relates in general to a recording medium and more specifically to an erasable, high speed, high density, optical storage medium which is both erasable and writable upon demand.

Currently, data can be stored on a wide variety of materials using various manipulable physical and/or chemical properties as state indicators. For example, conventional magnetic storage media using floppy disks and hard disks utilize the sense of magnetization impressed on a selected region of a surface of a metal oxide such as $Cr_2O_3$. The magnetization can be changed on demand using an external field which forms the basis for both writing and erasing data. The data is read by simply measuring the existing sense of magnetization. Magnetic media, however, are relatively slow in all functions, less dense in information storage capacity than any optically based storage medium and vulnerable to a variety of electromagnetic phenomenon.

Currently available optical storage media typically involves the use of multiple layers of metal and plastic. These media are irreversibly modified when the data is written on them by irradiating a memory element with activating radiation such as laser light. These media are typically purchased with the data, such as music, being contained on the article. Other optical memory devices such as WORM (write once read many times) allow the user to impress the data, but again the writing process is irreversible.

There are two commercially available forms of erasable optical media which are available in the prior art. One uses a polarization sensitive read mechanism in conjunction with a thermomagnetic induced surface polarization change between the written and erased states. The other is based on modulating the reflection/scattering optical properties of the medium using a light induced transition between amorphous and crystalline states. The material requirements for the magnetooptic medium are stringent, leading to low yield manufacturing. Furthermore, the basic magnetooptic read mechanism involves a very weak effect so the support in electronics must be elaborate, and the light must be very highly polarized. In both of these types of media currently on the market, the time required to write data is at best on the order of 1 $\mu$sec. Neither of these types of existing erasable optical media has sufficient durability or is sufficiently inexpensive. In view of these shortcomings, there is a need for basic improvements to existing erasable optical memory systems of the type described above.

It can therefore be seen that there is a continuous need in the field for a system which can provide the desirable attributes of conventionally available optical memory systems, such as CD's, but will also provide the advantage of being erasable. A further need is for a system which would not require metal components, and thus provide for immunity from damage by electromagnetic radiation.

SUMMARY OF THE INVENTION

It is therefore an object of the present invention to overcome the problems of the prior art described above, and to provide an optical information storage system which utilizes light and its own intrinsic photochromic properties to chemically encode information. The system further provides the advantage of selectively erasing the encoded information by exposing the storage medium to a selected wavelength or heating in bulk and erasing the entire medium. Optionally, the entire image can be erased by heating the entire medium using an oven.

The present invention is based upon the discovery that certain solid transition metal oxides can be formed in layers on a supporting substrate and used to chemically encode information through the use of light and their intrinsic photochromic properties. The solid metal oxides suitable for this invention are those which undergo photoinduced and thermoenhanced loss of gas phase $O_2$ to produce mixed valence oxides and include $WO_3$, $V_2O_5$, $TiO_2$ and $MoO_3$. Any other solid transition metal oxide which exhibits these characteristics is included within the scope of this invention. In an embodiment where tungsten oxide is used, $WO_3$ is the erased state, and both oxidation states $W^V$ and $W^{VI}$ are present in the written state. The two oxidation states must have similar or identical chemical sites. A particular oxide can be operationally established for any possible choice of oxide by exposing a possible candidate oxide to blue-green or shorter wavelength light under vacuum and observing whether a color change occurs. Further, as discussed by Duffy ("Bonding Energy Levels & Bands in Inorganic Solids", J. A. Duffy,; 1990, Longman Scientific & Technical, Essex, UK, Copublished in the US with John Wiley & Sons, Inc. New York, 1990) only those mixed valence compounds having semiconductor or metallic electrical properties will work in this invention. Metal oxides known to form "tungsten bronze-like" materials as defined by Duffy, i.e. $WO_3$, $MoO_3$, and $V_2O_5$ are preferred embodiments of the present invention.

In the context of tungsten, Duffy (pp. 182–191) described appropriate mixed valence compounds using the formula

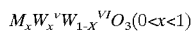

$$M_xW_x^VW_{1-x}^{VI}O_3 (0<x<1)$$

where M may be either an alkali metal ion (with nominal +1 charge) or a proton. More generally, (see P. G. Dickens and M. S. Whittingham Quart. Rev. 22, 30(1968)) it has been stated that other metal ions are also usable. There is currently some uncertainty in the primary scientific literature (e.g. C. Bechinger, G. Oefinger, S. Herminghaus and P. Leiderer, J. Appl. Phys. 74, pp. 4527–4533(1993)) on the need for a metal ion or proton to produce the highly colored (blue in the case of $WO_3$ starting material) state from the simple metal oxide. Therefore, x=0 is suitable for this invention, but use of M in the form of a dopant or additive could have application in some embodiments of the present invention. Where a dopant or additive is used, M=$H^+$, $Li^+$, $Na^+$, or $K^+$. However, previously dried $WO_3$, $MoO_3$, or $V_2O_5$, which is then allowed to equilibrate with typical ambient air is a suitable material for an embodiment of the invention. The above references to Duffy, Dickens et al. and Bechinger et al. are incorporated herein by reference.

The possible use of M in some embodiments of this invention stems from three types of considerations. First, the spectral properties of the medium can be varied by choice of M and this allows some tailoring of the medium to the spectral characteristics of available laser systems, i.e. colors. This means that reading and writing functions can be engineered to some extent based on the availability of laser systems. Second, the time and laser power required for switching between the erased and written states will depend to some extent on the nature of M. Third, the stability and overall durability of the written and erased state depends on the nature of M. These considerations are not independent of each other and so a balancing will be required for engineering specific systems. In the discussion which follows, use of M will not be referred to further because the use of $WO_3$ and $MoO_3$ without any added M already affords a nearly perfect match between the laser chemical properties of the medium and various properties of YAG and GaAs based laser systems. It should be understood that the scope of this invention includes the potential use of M in some embodiments.

Imaging is accomplished in combination with simultaneously exposing the oxide layer, under ambient conditions, including the presence of gas phase $O_2$, to a selected range of wavelengths of light in the blue-green or shorter (254 nm to 575 nm) spectrum, and to infrared radiation (800 nm to 10.6 $\mu$m) or heat, resulting in the formation of a chemically encoded readable image on the layer of said metal oxide. This image is permanent in nature and can be stored indefinitely. As will be described below in greater detail, the function of the infrared radiation is to heat the medium with spatial selectivity and thereby facilitate the write process in the exposed area. The image can be selectively erased by simply exposing the oxide layer to infrared radiation (heat) in the presence of gaseous $O_2$ which restores the exposed area to its original state prior to imaging. Optionally, the entire image can be erased by heating the entire medium using an oven. Oxides of the metals W and Mo have been found to be particularly suitable for use in the present invention.

In one embodiment of the present invention, a layer of $WO_3$ powder (particle size 1–10 $\mu$m) approximately 1 mm thick is formed on a 2 cm diameter disk of fused quartz. In use, an optically readable image is formed on the $WO_3$ layer by simultaneously exposing the layer to blue-green light and infrared light in selected regions of the layer to form a permanent optically readable image thereon. The image, or portions of the image may be conveniently erased by exposing the selected portions of the image to infrared radiation in the presence of gaseous $O_2$. The entire image can be erased by heating the entire medium using an oven. In addition to providing a convenient imaging system which is erasable, the medium has all of the favorable advantages, high storage density, high speed, and durability of conventional CD's.

An example of the theory or mechanism which is involved in the imaging system of the present invention can be illustrated for the transition metal oxide $WO_3$. The reaction which occurs during the imaging step in which the $WO_3$ layer is exposed to blue-green light and IR light is a change in color of the layer from bright yellow to dark blue with the reaction being described by equation 1

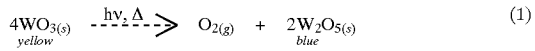
(1)

In its blue color form, the oxide is illustrated in equation 1 as $W_2O_{5(s)}$

Because the $WO_3$ is the thermodynamic ground state for the tungsten-oxygen system, the reverse action is easily thermally driven and is illustrated by equation 2

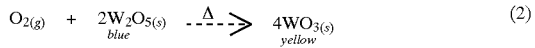
(2)

As will be hereinafter illustrated, the blue color oxide state will be shown as $WO_{2.5}$.

The change from yellow to blue and the reverse reaction from blue to yellow constitutes the write and erase modes of the medium, respectively. The transition can be easily observed or read using absorption, reflectance, or Raman scattering measurements in either the UV—visible or IR spectral regions by conventional techniques available in the art. The Raman scattering utilized is not surface enhanced. In reading a $WO_3$ based medium, the Raman scattering could be resonance enhanced, but not surface enhanced.

BRIEF DESCRIPTION OF THE DRAWINGS

FIG. 3 is a schematic diagram which depicts an enlarged view of the recording medium mounting area of FIG. 2.

DETAILED DESCRIPTION OF THE INVENTION

Figure 1:
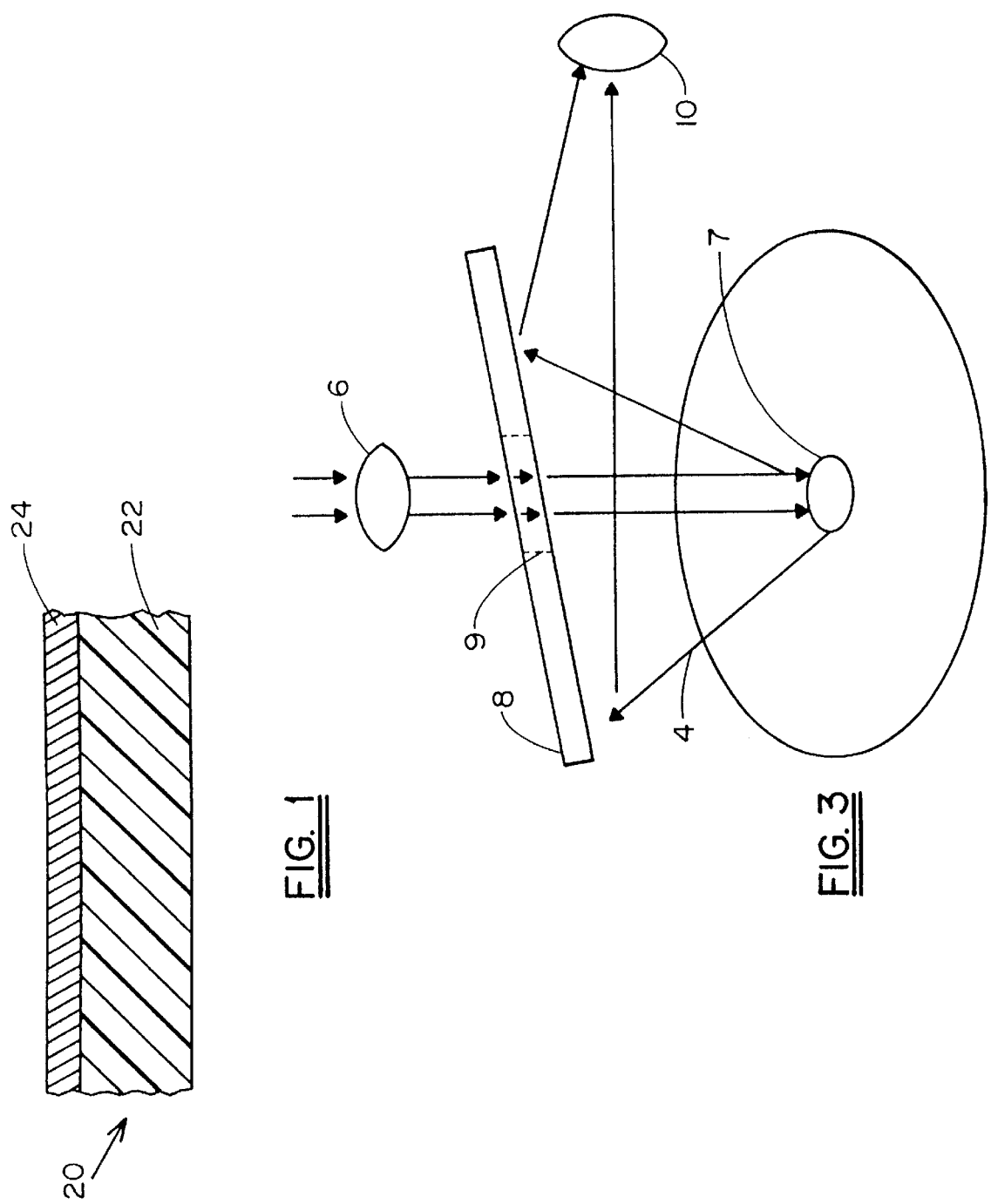
FIG. 1 is a side elevational sectional view of one embodiment of a device of the present invention.

The present invention is described in more detail with reference to the accompanying drawings where in FIG. 1 an erasable optical storage medium of the present invention is illustrated in the form partial side sectional view of a disk 20 which comprises a supporting substrate 22 containing a thin coherent layer or film of optical memory media 24 on the substrate.

Substrate 22 may comprise any suitable material which is capable of supporting layer or film 24, and which is substantially inert and impervious to the radiation and/or heat used in the imaging and erase process of the present invention. The substrate must also have appropriate thermal conductivity such that the infrared radiated spot can achieve an appropriate temperature. Suitable substrates include fused silica, quartz, silicon, sapphire, plastics, and the like. The optical storage medium 20 is normally used in the form of a circular disk. It should be understood, however, that other configurations may also be used depending on the application of the medium. For a particular embodiment which is designed to be erased in bulk, the substrate and layers must be able to withstand repeated heating and cooling cycles.

The optical memory media 24 may comprise any compound or material which undergoes a chemical change as in equations 1 and 2 when exposed to radiation of selected wavelengths under ambient conditions which include $O_2$, and which change can be optically read or scanned. A further requirement is that the encoded change or written data may be selectively erased upon exposure to infrared radiation or to heat in the presence of $O_2$.

Preferred materials suitable for use as the imaging medium for layer 24 comprise $WO_3$ and $MoO_3$.

The thickness of layer or film 24 should be at least on the order of about $10^2$ nm. A suitable range for the thickness of layer 24 would be from about 0.1–10 $\mu$m. The layer 24 may be in the form of a simple coherent powder layer, a powder containing a small amount of adhesive to bind the layer to substrate 22, or it may be coated in a slurry onto substrate 12 in any suitable inert binder material. In addition to the above, layer 24 can be formed on substrate 22 by other conventional techniques known to the art such as sputtering, vapor deposition or electrochemical methods.

A disk suitable for use in the present invention was prepared as follows: $WO_3$ powder available from Aldrich Corporation, (purity 99.99 5%) was evenly spread and compacted into a circular recess formed in the middle of a 2 cm diameter fused quartz disk to form a coherent layer of powdered WO$_3$. The disk has a thickness of about 0.3 cm. The recess was approximately 0.2 cm in diameter and 0.1 cm deep. This disk or medium is used in demonstrating the present invention and is illustrated by reference character 7 in FIGS. 2 and 3 of the drawings.

Figure 2:
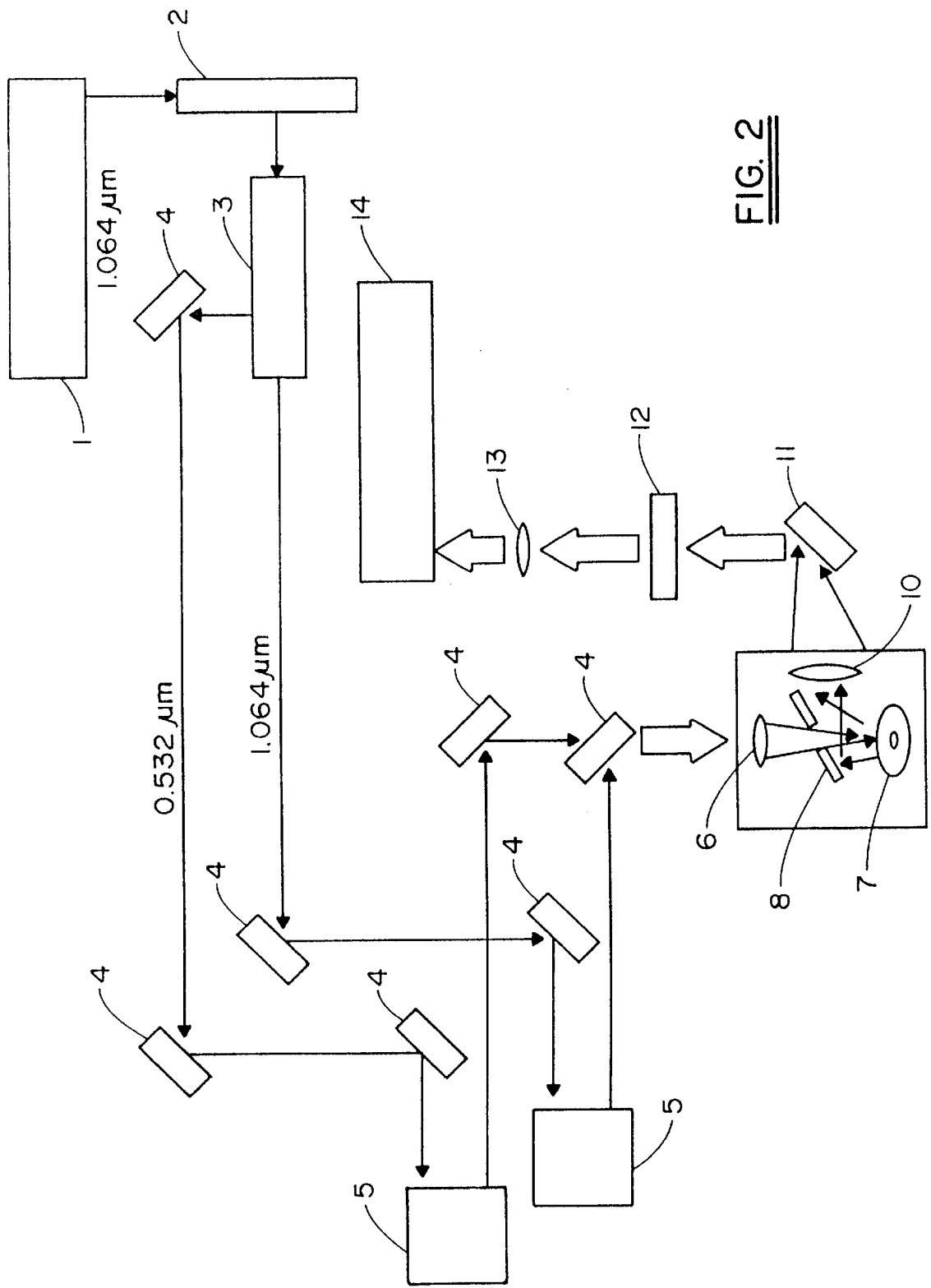
FIG. 2 depicts a schematic diagram of apparatus for use in the reading, writing, and erasing according to the present invention.

FIG. 2 depicts a schematic diagram of the Raman apparatus employed to demonstrate the write, erase and read processes of the present invention using the disk prepared above. Although the process is described in terms of laser pulses, it should be understood that for some applications continuous wave (CW) lasers can be used. It should also be clear that no small metal coated spheres or other structures are employed to achieve a surface enhanced Raman scattering effect as has been used in other prior art processes.

We define a "pulse train" as a continuous series of light pulses each of a given time duration. A mode locked, Q-switched Quantronix YAG laser 1 is used to produce a pulse train of ≈100 psec duration pulses of 1.064 μm light each separated by ≈12 nsec. This pulse train enters an electro-optic pulse selector 2 and an 8 consecutive pulse section of the pulse train is selected each millisecond. Each 8 pulse series is directed into a harmonic generator 3 which converts ≈10% of each 1.064 μm pulse into a roughly equal time duration 0.532 μm wavelength pulse. Thus, for each infrared pulse which enters the (KDP) harmonic generator, two output pulses are generated. One is nearly identical to the input in every respect except power content, but the other is of only half the wavelength, i.e. green 0.532 μm wavelength. The results obtained correspond to an average power of ≈3–5 mW for the 0.532 μm wavelength train and ≈50 mW for the 1.064 μm wavelength train.

Each of the pulse trains exits the harmonic generator and is directed independently by mirrors 4 along separate paths. In FIG. 2, corner cubes 5 are used to form two "delay lines" which allow for the distances each color pulse train travels to be varied independently. This feature is necessary to ensure that each pulse train arrives at the medium at the same time. The two pulse trains are focussed by a single lens 6 onto the disk or medium 7 to a single ≈300 μm diameter spot containing the layer of WO$_3$ (see also FIG. 3). Temporal and spatial overlap of the two pulse trains were checked using fast photodiodes, an EG&G boxcar averager, an IR viewer, and a CCD camera, respectively.

The two pulse trains contact the medium (sample) surface after passing through a flat elliptical shaped 3 cm×5 cm, mirror 8 with a 4 mm hole 9 in it as shown in FIG. 3. The mirror is placed ≈3–5 cm above the medium 7, with the plane of the mirror oriented ≈45° with respect to the surface of the medium. Some of the light (≈⅛) which is scattered or reflected from the medium strikes mirror 8 which contains hole 9 through the mirror thickness. A Raman signal is light which has a wavelength shifted from an incident wavelength during the scattered process.

All the light which strikes mirror 8 is collected by an uncoated aspheric lens 10. The light collected using this lens is directed off an uncoated turning mirror 11, through a holographic edge filter 12 (POC, Tuscon Ark.) and focussed with a final collection lens 13 to a ≈2 mm spot on the entrance spectrograph exit slit of an Instruments SA 0.32 meter spectrograph (1200 grooves/mm). The spectrograph exit slit is fitted with the 1028 channel photodiode array of an EG&G OMA III system. The OMA III is operated in the gated mode such that it is triggered by the Q-switch synchronization pulse with a fixed 1 nsec gate width. The holographic edge filter is necessary to remove all the infrared and most of the incident 0.532 μm light. The spectrograph/OMA III system 14 allows quantification of the amount of light which is shifted in wavelength from the incident 0.532 μm light. In the present embodiment, this Raman signal is the read mechanism for the medium. In order to expose the medium to light source(s), one need only block the appropriate light path(s) with an opaque object. In this way the medium can be exposed to either just 0.532 μm light for reading, both 0.532 μm and 1.064 μm for writing, or just 1.064 μm for erasing. To easily observe the reading, writing, or erasing processes, 2 minute exposures to the appropriate pulse train(s) are adequate.

FIG. 3 depicts an enlarged view of the recording medium mounting area of FIG. 2 at a higher scale illustrating the fused silica disk 7 containing the WO$_3$ powder layer.

FIG. 3 depicts a schematic close-up view of the interaction zone, i.e., the region where the two light sources overlap a single bit of digital data. Although, the process parameters for utilizing the recording medium of the present invention have been clearly established, the current understanding of the microscopic mechanism involved in the processes associated with the invention may be somewhat incomplete. The pertinent characteristics of WO$_3$ have been described to establish context. The interactions involving the light sources and the surface of the medium corresponding to: 1) writing; 2) erasing; and 3) reading data were then considered. For completeness, and as an illustration of an understanding of the invention, the following theory and/or mechanisms are believed relevant to an understanding of the present invention.

If the medium is initially in the erased form, i.e., nominally WO$_3$, it is yellow and possesses strong Raman features at 716 cm$^{-1}$ and 805 cm$^{-1}$. Unless otherwise stated, in what follows it can be assumed the medium is in contact with ambient air,. i.e., ≈20°–25° C. with total pressure roughly 760 torr. It is reasonable to expect that there is some water and CO$_2$ present. While it is believed that the incident light or heat induces some chemistry involving these species, these species do not presently seem to have a significant part in the invention. The lattice of standard yellow WO$_3$ is formed from (WO$_6$) octahedral units. These octahedral units are somewhat distorted and internal vibrations of these octahedral units, associated with the changing the type of distortion, are in fact the motions involved in producing the Raman features.

Assuming the medium is initially in the erased form, exposing it to a pulse of infrared radiation (e.g. ≈1.06 μm) imparts heat to the medium in proportion to the amount of light actually absorbed. However, in the present case, only a small amount of heat is absorbed because the absorption/reflectivity spectrum of WO$_3$ suggests little absorption of light near wavelengths of ≈1.06 μm. Whatever is absorbed initially excites various motions in the medium. By means of the coupling between the motions of electrons and nuclei, this absorption ultimately results in random motion of the nuclei and electrons comprising the lattice of the medium, i.e. heating. This simple heating mostly results in evaporation of some water, CO$_2$, or other impurities which is of no consequence.

1. To describe the microscopic processes associated with writing data onto the medium, it is presumed that a pulse of each color arrives simultaneously to the erased medium surface. At first, the green light has a greater effect on the medium because it is absorbed to a greater extent than the infrared. The green light initially excites electrons from valence bands which have at least some of their origin in wavefunctions associated with oxygen atoms. After electronic excitation, some electrons may be trapped by, or in the vicinity of, the $W^{VI}$ metal ions at the centers of the octahedral units thereby forming the $W^V$ metal ions responsible for the strong color change. In addition to the well known color change, the presence of these ions in blue $WO_{2.5}$ was confirmed by ESCA (electron spectroscopy for chemical analysis). Each $W^V$ ion affects the bonding in the octahedral units in such a way as to weaken the bonding between the metal and at least one oxygen atom. An observable effect of this bonding modification is the elimination of the two largest Raman features associated with $WO_3$. If an oxygen atom, whose bonding to its adjacent $W^{VI}$ center is weakened, is in close enough proximity to interact with another oxygen atom, it is possible that the two oxygen atoms will bond to each other forming an $O_2$ molecule. If this $O_2$ molecule is sufficiently close to the surface of the medium then it may diffuse to, or on that surface and then desorb from that surface leaving behind a blue, oxygen deficient medium. This blue medium contains so called crystallographic shearplanes having both long and short range order. The yellow medium is composed of octahedra joined at the corners. The blue material contains octahedra joined along edges. Neither of these materials is amorphous. This is the basic mechanism of the write process, but there is another important part of the process which is essential to the present invention.

The absorption spectrum of $WO_{2.5}$ is very different from that of the $WO_3$ in that is has a strong absorption starting in the red ($\approx$700 nm), peaking around 1.06±0.25 μm and extending into the infrared. For this reason, each time a $W^{VI}$ is converted to $W^V$, infrared radiation is more strongly absorbed. The absorption of infrared heats and thereby "softens" the lattice, increasing the mobility of oxygen atoms and molecules. The heating also helps to break various chemical bonds including metal-oxygen bonds. The cooperative effect of both colors is different from the sum of the effects of each color applied separately. The greater the conversion of $W^{VI}$ to $W^V$, the greater the absorption of infrared further enhancing the conversion. Whereas it is possible to induce the conversion of $W^{VI}$ to $W^V$ using a single blue-green or shorter wavelength color, at typical ambient atmospheric pressure and temperature much higher laser power is needed. This invention allows lower power lasers to be used making the apparatus needed to execute the process much easier to engineer. It may also allow increased storage density by manipulation of the spatial and temporal overlap between the two beams.

2. Having written a blue spot on the surface of the medium by converting $WO_3$ to $WO_{2.5}$, as described above, the erase process can now be considered. This involves exposing the medium containing written data to infrared radiation alone. The medium absorbs the infrared strongly which again results in heating and softening of the lattice. Collisions between the gas phase $O_2$ and the various surface species are constantly occurring during the infrared exposure. The lattice heating facilitates the chemical reaction in which $O_2$ from the ambient air reacts with the surface $WO_{2.5}$ to reform yellow $WO_3$. In the erase mode the blue-green light is not present so the reaction in which the $W^{VI}$ is converted to $W^V$ does not occur appreciably. The net effect of the infrared by itself interacting with the previously written medium is the conversion of blue $W^V$ to yellow $W^{VI}$ until the absorption of the infrared falls sufficiently to limit the amount of heating which occurs. As stated above this eventually happens because the yellow material has a relatively small absorption coefficient in the infrared (1.064 μm).

3. The read process can be accomplished using conventional reflectance, absorption or Raman scattering. It should be understood that any process which is selectively sensitive to the presence of $WO_{2.5}$ and $WO_3$ is a potential read mechanism. In the case of films this also includes electrical properties. In each case only a small amount of one color light is incident on the medium surface which is not sufficient to either heat the medium or, by electronic excitation, weaken many metal to oxygen bonds so no detectable chemical reactions occur. The data is read by detecting the amount of reflected or scattered light from the medium surface or by the amount of light which passes through a layer. These are standard conventional measurements known to anyone familiar with modern spectroscopic techniques. The spectroscopic properties of the parent oxides and their derived mixed valence oxides are so different that virtually any detection (read) scheme is many times more sensitive than the most favorable scheme currently being applied to existing erasable optical memory.

Parameters Required to Effect the Data Storage Processes

In order to accomplish the writing process for the present invention, at least two colors, i.e. wavelengths, of light are needed. One light source heats the medium. The other light source provides electronic excitation to the medium. The "read" process may involve the electronic excitation light source. The "write" process involves the simultaneous use of both sources. The "erase" process involves only the heating source. In a further embodiment, it is also possible to utilize three sources. A "read" color, a "heat" color for erasing, and a combination of the "heat" and a third color for writing. The heat source can be any conventional infrared laser or furnace. Suitable lasers include YAG (wavelength=1.06 μm) or GaAs based lasers ($\approx$850 nm).

The electronic excitation/read may be accomplished at any wavelength of roughly 575 nm or shorter. This typically includes conventional ion lasers and dye lasers but most probably the sources of choices will be either frequency doubled YAG(532 nm) or frequency doubled GaAs based devices ($\approx$425 nm).

If use of a third color is desired, it will be so that reading can be accomplished near an extremum of the reflectance curve of the written medium. This will minimize read times and relax medium smoothness requirements on the read process. For the tungsten and molybdenum oxide based media the optimal read color will be red. The lasers used in the present invention may be either pulsed or continuous wave (CW). Either CW GaAs lasers, operated at less than 100% duty cycle, or YAG based devices would be suitable.

It may also be possible to use a single YAG laser as the source of all the wavelengths even in the three color schemes. It may also be possible to use an optical parametric oscillator. A single GaAs based laser source can also be used to supply all the colors. For either a single YAG or a GaAs device to provide all the colors, harmonic generation would be used. This option has been commercially available in the field for some time. If operated CW, any of the laser sources for heating would be adequate provided at least $10^1$–$10^2$ mW average power were available.

In summary, the medium of the present invention has two states corresponding to the written and erased states, respectively. The erased state corresponds to a fully oxygenated metal oxide as exemplified by yellow $WO_3$. The written state corresponds to a partially deoxygenated mixed valence derivative of the same oxide as exemplified by blue $WO_{2.5}$. It is possible to attain the written state by simultaneously exposing the yellow erased state to pulses of IR and blue-green or shorter wavelengths in ambient air or by exposing it to 514 or 488 nm continuous wave (CW) laser light ($\approx$25 mW) under reduced oxygen partial pressure. The erased state can be reached from the written state by exposing the medium to a sufficiently intense IR radiation at atmospheric oxygen pressure or by simply heating it in ambient air in a furnace and allowing the medium to equilibrate. Using $WO_3$ as an example, the transition in the furnace requires about $10^1$–$10^2$ seconds in a tube furnace at about 400° C.

While specific embodiments of the invention have been illustrated and described herein, it is realized that modifications and changes will occur to those skilled in the art. It is therefore to be understood that the appended claims are intended to cover all modifications and changes as fall within the true spirit and scope of the invention.

What is claimed is:

1. A data storage process which comprises:
    a. providing an erasable high speed, high density, storage medium which includes a transition metal oxide layer which is doped with a metal ion or proton in order to control the spectral properties of said oxide layer and where said oxide layer is capable of undergoing an optically readable chemical change when simultaneously exposed to heat and to light of a selected wavelength; and
    b. simultaneously exposing said layer to heat and to radiation in the blue-green or shorter wavelength spectrum under ambient conditions which include oxygen, whereby a photochemical reaction is induced which includes an exchange of oxygen, resulting in the formation of an optically readable image in the exposed regions of said oxide layer.

2. The process of claim 1 in which the metal oxide is selected from the group consisting of $WO_3$, $MoO_3$ and $V_2O_5$.

3. A device which contains an optically readable image which comprises:
    a. an erasable high speed, high density, storage medium which includes a transition metal oxide layer where said oxide layer is capable of undergoing an optically readable chemical change when simultaneously exposed to heat and to light of a selected wavelength; and
    b. where said layer has been simultaneously exposed to heat and to radiation in the blue-green or shorter wavelength spectrum under ambient conditions which include oxygen whereby a photochemical reaction is induced which includes an exchange of oxygen resulting in the formation of an optically readable image in the exposed regions of said oxide layer.

4. The device of claim 3 in which the metal oxide is an oxide of any one of W. Mo. Ti. or V.

5. The device of claim 3 where the metal oxide is doped with a metal ion or proton.

6. The device of claim 3 which further includes selectively erasing at least a portion of the image formed in (b) above by exposing said image to infrared radiation in the presence of $O_2$.

7. A device which contains an optically readable image which comprises:
    (a) an erasable high speed, high density, storage medium which includes a layer of $WO_3$, where said layer is capable of undergoing an optically readable chemical change when simultaneously exposed to heat and to light of a selected wavelength; and
    (b) where said layer has been simultaneously exposed to blue-green light or shorter wavelength spectrum, and infrared light in selective regions of said layer, under ambient conditions including $O_2$ whereby a photochemical reaction is induced which includes an exchange of oxygen, resulting in the formation of a permanent optically readable image thereon.

* * * * *